United States Patent Office 3,101,818
Patented Aug. 27, 1963

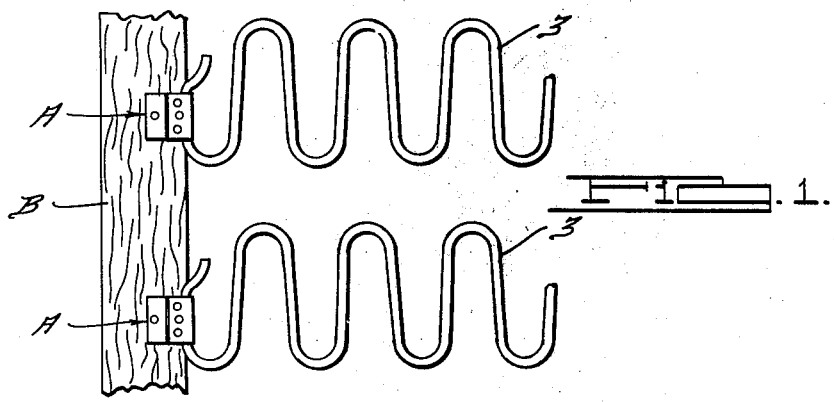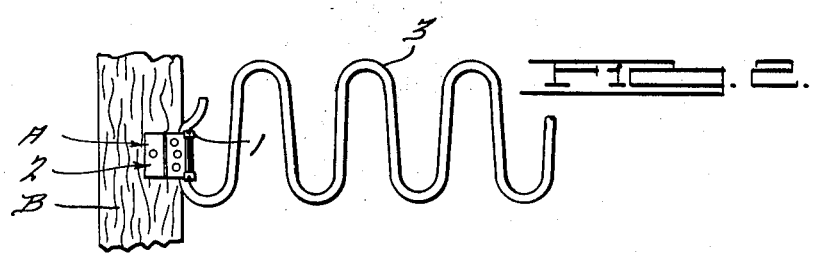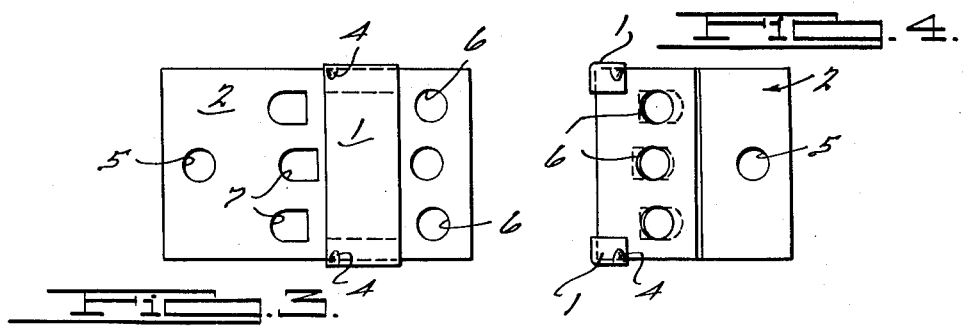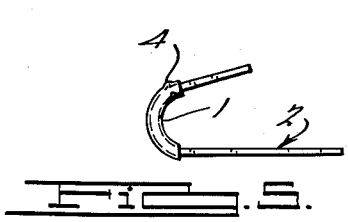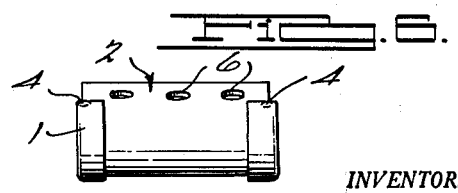

3,101,818
DEVICES FOR SECURING SPRINGS TO FURNITURE AND OTHER FRAMEWORK
Royston Percival Barley, Southend-on-Sea, England, assignor to No-Sag Spring Company, Detroit, Mich., a corporation of Michigan
Filed Sept. 21, 1960, Ser. No. 57,438
1 Claim. (Cl. 189—35)

This invention has reference to devices for securing springs to framework and to one another, applicable particularly but not essentially to furniture framework when mounting springs thereon as foundations for seats or backs.

These devices, often referred to in the trade as fixing clips, for the most part usually consist of a piece of flat steel bent into a convenient configuration to provide a hook part to receive the end of the spring and an attachment part having a hole or holes for securement to a frame member by nails or screws, or for securement by other means. This configuration varies according to the shape, material and disposition of the part of the frame member or "rail" to which the clip is to be fixed, and also according to the ultimate position which the spring is to assume in relation to the rail, as well as to the strength or gauge of the spring, and also to whether or not the clip is to be used as a link member connecting two springs in linear continuity. In all cases, however, with clips of the foregoing type improved by the invention, there is a hook part or parts made by transversely bending a piece of flat steel plate at one end into substantially a U-shape the crotch of which receives the round section wire end of the spring which swivels therein as the spring is subjected to load. For convenience spring securing devices as just described are referred to herein as spring fixing clips of the type described or simply as clips.

The type of spring which is to be attached to the clip forms no part of the invention and may be of any requisite design so long as it is made of round section wire terminating in a hooking piece to engage the hook part of the clip. One type of spring which is adapted to be secured by the clip of the invention is the so-called serpentine spring, which is a flat elongated member with the wire bent in sinuous or zig-zag form, generally with all the transverse bends substantially parallel and connected at the actual bend by a curve. A plurality of springs of this character are generally used in parallel disposition across the seat or back area of a chair or settee, being connected by their ends of the framework. Such springs are usually supplied in coiled or curled form so that they may be opened out in arched and stressed formation when securing by their ends to the framework. Each end of the spring terminates in one of its transverse bends which drops snugly into the crotch of the clip when attaching the spring to the framework.

The primary object of the present invention is to provide a spring fixing clip of the type described in which squeaking due to the swivelling movement of the spring end in the clip is obviated or substantially minimized. Linings of comparatively soft materials such as rubberized cotton tape, fibre strip, paper tape with lamination of a plastic substance, and plastic substances in the crotch of the hook part of the clip having proved effective for damping down the squeak but owing to wear their efficiency is shortlived. On the other hand, making the clips entirely of a substantially non-squeaking material presents problems. For example, the use of various metals such as brass, copper, aluminum alloys or bearing metals like Phosphor bronze for the clips to avoid the contact of steel against steel, which is the cause of the squeaking, either results in weakness or softness when made from strip the same gauge as that employed for steel, or is uneconomical if increased to bear the same load as that of the steel it replaces.

According to the present invention a spring fixing clip of the type described is made of steel and provided at the crotch with a facing of another metal chosen to minimize squeaking. The facing may be comparatively thin, and as an example, a basic steel strip having a thickness of the order of .03" to .05" can have a facing of brass as thick as a foil upwards to .01", but the invention is not restricted to any particular dimensions.

The facing metal may be attached in any suitable way and may cover only the area in the actual crotch which is connected by the spring end or a greater part or the whole of that surface of the basic steel strip which forms the interior of the crotch. The said facing may extend to cover not only the transverse width of the crotch surface but also the edges of the steel strip.

In order that the said invention may be readily understood, some embodiments thereof will be described by way of example with the aid of the accompanying drawing, wherein:

FIGURE 1 is a plan view of two spring fixing clips according to the invention, shown in use attached to a framework and holding the ends of springs;

FIGURE 2 is a plan view of a second type of spring fixing clip wherein the edges of the softer metal facing are turned over the edges of the steel spring clip and slightly under the outside surface thereon;

FIGURE 3 is a view of a spring clip flattened out with the metal facing laid thereon with the edges turned under preparatory to the clip being bent into its final U-shape;

FIGURE 4 is a clip bent into U-shape from the flat form seen in FIGURE 3; and

FIGURES 5 and 6 are, respectively, a side view and front view of a completed spring clip with the soft metal facing in position with its edges bent over and folded under.

Like numerals and letters of reference indicate the same or corresponding parts throughout the several views.

Referring to the drawing, FIGURE 1 shows how springs 3 of the serpentine form hereinbefore described are attached by one end hooking into the crotch of a clip designated generally by the reference A which is secured to the rail B of a piece of furniture.

In the example shown in FIGURES 2–6, a facing of thin brass strip 1 is secured to the inside surface of the flat basic steel strip 2 before it is bent into its final form, i.e., at the area where ultimately the crotch of the hook part will appear. This brass strip facing 1 is sufficiently wider than the basic steel strip 2 to enable its edges to be turned over the edges of the steel strip 2 and slightly under to the outside surface thereof. The said facing 1 can extend from one end of the steel surface 2 to the other which naturally includes the crotch area, or may extend only part of the length at the said crotch area as illustrated.

The brass facing 1 may be brazed or riveted into position or stuck by any suitable adhesive, and it is assumed that the facings 1 in the FIGURE 1 construction have been secured in this way. Another way of securing is to lay the brass facing 1 on the selected steel surface 2 and then by punching to impress a number of small projections in the brass and into the steel.

The facing may be applied to the steel surface 2 after the clip has been fashioned into its final form. In such a case, a piece of brass strip 2 would be bent into substantially a U with the legs sufficiently long to cover the corresponding surfaces of the hook crotch which are contacted by the spring 3. The said legs are splayed divergently out of the parallel so that they are a tightly forced friction fit when inserted in the crotch. As mentioned, an adhesive may be used, but as illustrated in FIGURES 2-6, the facing may have projecting edges or ears capable of being bent over the edges of the steel strip 2. Such edges may have punchings 4 to attach the facing more securely.

One simple shape of spring fixing clip 2 to which the invention is applicable is a simple J, as more clearly seen in FIGURE 5, having a hole or holes 5 (FIGURES 2, 3, 4 and 6) in the long leg away from the crotch for receiving attaching nails, and similarly a hole or holes 6 in the short leg which register with complemental holes of larger diameter or slots 7 in the long leg in the region of the crotch to receive further fixing nails which can be driven at an angle into the frame.

What is claimed is:

A clip for supporting the end of a sinuous spring strip, said clip being made from metal stock bent into U-shape, and an inner facing of another strip of material having low friction properties to minimize squeaking mechanically secured to the inner face of the U portion of the clip by having the ends overlap the side edges and the outer face of the clip at the U portion with the overlapped ends also of U-shape following the U-shape of the outer face of the clip for retaining the inner facing strip fixed to the U portion against lateral and longitudinal movement relative thereto.

References Cited in the file of this patent

UNITED STATES PATENTS

| | | |
|---|---|---|
| 2,652,885 | Engel | Sept. 22, 1953 |
| 2,843,192 | Krakayer | July 15, 1958 |
| 2,853,123 | Peery | Sept. 23, 1958 |
| 3,017,694 | Goldsmith | Jan. 23, 1962 |